United States Patent [19]
Thomason et al.

[11] Patent Number: 4,462,044
[45] Date of Patent: Jul. 24, 1984

[54] TIMING SYSTEM FOR A THREE DIMENSIONAL VIBRATING MIRROR DISPLAY

[75] Inventors: Robert L. Thomason, Corona del Mar; Henry S. Stover, Montclair, both of Calif.

[73] Assignee: Spacegraph, Ltd., Irvine, Calif.

[21] Appl. No.: 401,407

[22] Filed: Jul. 23, 1982

[51] Int. Cl.³ .............................................. H04N 9/54
[52] U.S. Cl. ....................................... 358/89; 340/755
[58] Field of Search ..................... 358/89, 88; 364/521, 364/522, 525; 340/755

[56] References Cited

U.S. PATENT DOCUMENTS

4,130,832 12/1978 Sher ....................................... 358/89

Primary Examiner—John C. Martin
Assistant Examiner—Victor Kostak
Attorney, Agent, or Firm—Blakely, Sokoloff, Taylor & Zafman

[57] ABSTRACT

A timing system for a three dimensional vibrating mirror display which controls the display of information throughout the varying rate of sweep through the display volume characteristic of such systems and assures proper interlacing of the forestroke and backstroke images in a simple efficient manner is disclosed. The system includes an anisochronous clock which varies its clocking rate in proportion to the momentary velocity of movement through the display volume so that the displayed image planes are equally spaced throughout the depth of the display volume. The anisochronous clock of the invention utilizes a relatively simple circuit to sequentially address a read-only memory in effect containing predetermined information regarding the velocity of sweep through the display volume for each position of the vibrating mirror, which information is used to generate a clock signal for controlling the display. A unique sensing circuit is operative on an optical sensor output signal detecting the mirror motion to synchronize the anisochronous clock with mirror position so that the anisochronous clock can synchronize display information with image motion, and so that the backstroke and forestroke displays will be properly interlaced. Other aspects and features are disclosed.

22 Claims, 6 Drawing Figures

ANISOCHRONOUS CLOCK GENERATOR

TIMING SYSTEM FOR A THREE DIMENSIONAL VIBRATING MIRROR DISPLAY

BACKGROUND OF THE INVENTION

1. Field of the Invention:

The present invention relates to the field of three dimensional displays.

2. Prior Art:

Three dimensional displays utilizing vibrating mirrors are known in the prior art. In accordance with this technology, a viewer does not look directly at the cathode ray tube (CRT) but instead looks at a mirror to see the reflection of the CRT image from a CRT mounted over the observer. When the mirror is flat, of course, the CRT image appears to be at a distance equal to the distance from the observer to the mirror plus the distance from the mirror to the CRT. By vibrating the mirror around its normally flat condition so that the mirror vibrates through concave and convex conditions, the image on the CRT will be made to appear further and closer away from the observer, respectively. The basic concept of such three dimensional displays is that if one vibrates the mirror at a relatively low frequency, say 30 Hz., and displays data at a much higher rate, so that multiple images, properly proportioned etc. can be displayed during any stroke of the mirror, those multiple images will appear to the observer as providing a single three dimensional image. Normally, the mirror is vibrated sinusoidally, as significant deviation from sinusoidal will give rise to substantial harmonics in the audible range, to the distraction of the observer. Further, sufficient deviation from sinusoidal vibration to attempt to obtain a more linear sweep through the display volume is generally not practically achieved, and accordingly not normally attempted.

As mentioned before, the timing of the two dimensional images on the CRT is coordinated with the position of the mirror so that individual, apparently equally spaced and properly sized planes of the three dimensional image are reflected by the mirror during the mirror forestroke, and interlaced images are reflected during the mirror backstroke motion. However, because the mirror velocity is sinusoidal rather than constant and for that matter the apparent depth of any image is not a linear function of mirror position, images put up at a uniform rate will appear to be concentrated toward the ends of the display volume because of the very low mirror velocity and attendant low rate of sweep through the display volume near the ends of the mirror travel. The desired three dimensional image is therefore created by putting up the images at a nonuniform time rate coordinated with mirror velocity so that the images appear equally spaced throughout the display volume during any stroke of the mirror. Further, the resolution in the third demension may be improved if during the opposite stroke, additional equally spaced images are put up with a timing so as to be interlaced with those put up during the prior stroke, so as to give the appearance of twice as many equally spaced images throughout the display volume.

The foregoing requirements for the apparent equal spacing of the images in the third dimension throughout the display volume by the interlacing of the forestroke and backstroke images requires both accurate knowledge of the mirror motion and careful timing of the display coordinated with that mirror motion. Various types of mirror sensors can be used although the requirements of accuracy and absence of drift impose severe requirements on the mirror's sensing system. Also the control of the display timing with respect to mirror motion may be done under software control, although doing this function under software control puts a heavy burden on the graphics computer, already sufficiently occupied with other functions such as image generation, coordinate transformations for image rotation, communication with the host computer, etc. The present invention comprises a particularly simple system for accurate tracking of mirror vibration in controlling the display rate with velocity without complicated sensing systems or overhead burden on the graphics computer.

SUMMARY OF THE INVENTION

A timing system for a three dimensional vibrating mirror display which controls the display of information throughout the varying rate of sweep through the display volume characteristic of such systems and assures proper interlacing of the forestroke and backstroke images in a simple efficient manner is disclosed. The system includes an anisochronous clock which varies its clocking rate in proportion to the momentary velocity of movement through the display volume so that the displayed image planes are equally spaced throughout the depth of the display volume. The anisochronous clock of the invention utilizes a relatively simple circuit to sequentially address a read-only memory in effect containing predetermined information regarding the velocity of sweep through the display volume for each position of the vibrating mirror, which information is used to generate a clock signal for controlling the display. A unique sensing circuit is operative on an optical sensor output signal detecting the mirror motion to synchronize the anisochronous clock with mirror position so that the anisochronous clock can synchronize display information with image motion, and so that the backstroke and forestroke displays will be properly interlaced. Other aspects and features are disclosed.

DETAILED DESCRIPTION OF THE INVENTION

Figure 1:
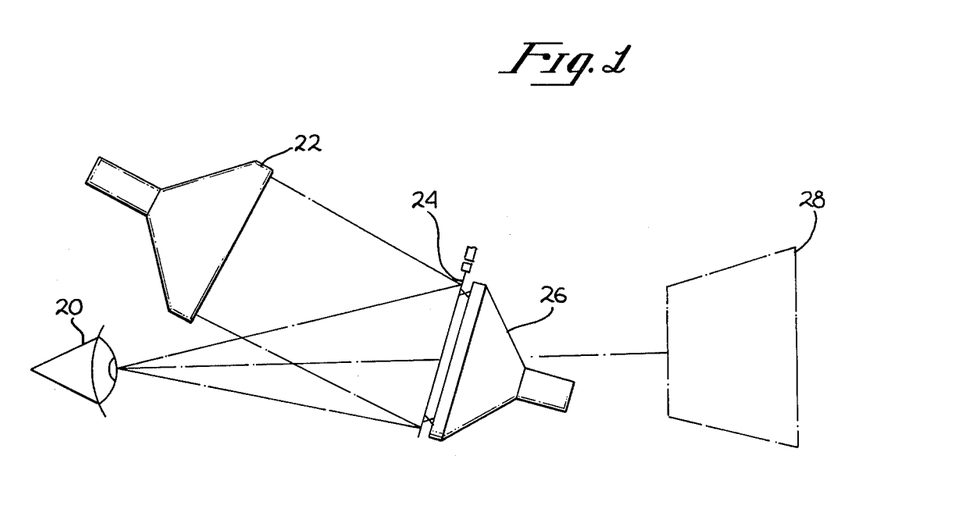
FIG. 1 is a schematic representation of a vibrating mirror three dimensional display system.

First referring to FIG. 1, a schematic representation of a vibrating mirror three dimensional display system may be seen. In general, such a system is configured so that the observer 20 may see the reflection of the image of a cathode ray tube 22 on the face of a vibrating mirror 24, the mirror 24 being maintained in sinusoidal vibration by a low frequency speaker or woofer 26. As the mirror vibrates through concave and convex positions, the image on the CRT 22 appears closer and further away from the observer, with the apparent depth range being dependent upon the various parameters of the system and the amplitude of vibration of the mirror. It can be shown that the apparent volume within which a three dimensional image may be displayed is not cylindrical or box-like, but that the apparent X and Y dimensions of the volume linearly increase with Z direction as illustrated by the dashed line 28 illustrating the apparent volume in the schematic of FIG. 1.

Figure 2:
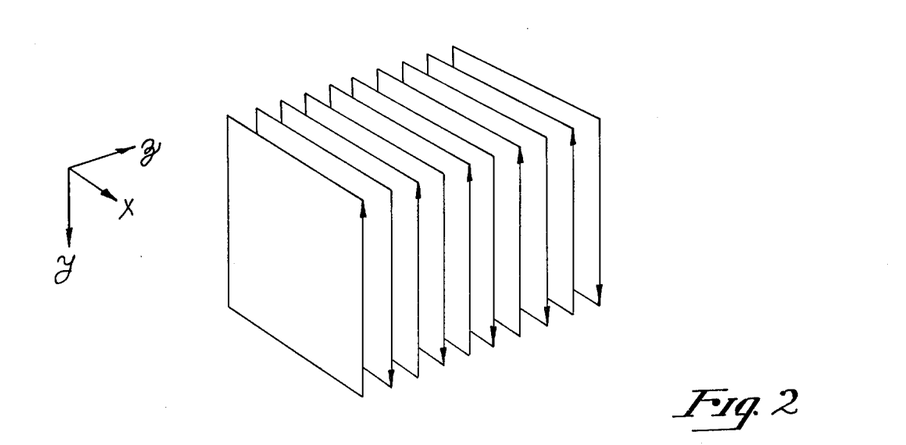
FIG. 2 is a schematic representation of the interlacing of a plurality of image planes to form a three dimensional viewable volume in a vibrating mirror three dimensional display system.

Now referring to FIG. 2, a plurality of parallel image planes are shown schematically, the planes being somewhat displaced from each other so that the plurality of planes fill a three dimensional volume. This figure is illustrative of one mode of operation of such display systems. In particular, it will be noted that arrows have been placed on the edges of the image planes, with alternate planes containing arrowheads having the same direction. Each image plane for a raster scan mode represents a full raster scan of the CRT 22 and of course, would display all points on the three dimensional image falling at the depth corresponding to that image plane.

It will be noted that the image planes have been drawn as parallel planes, rather than sloping planes. Since the mirror is vibrating at 30 Hz. and the length of time required to display a full raster scan is significant, there will be significant motion of the mirror during the display time for one full scan which would tend to cause a sloping or inclination of one image plane with respect to the Z axis of the viewable volume. However, because the observer, mirror and CRT are not colinear, one edge of the CRT will appear closer to the viewer than the other edge. Accordingly, by choosing the proper direction of the vertical sweep of the raster scan and properly timing the rate at which the image area is swept, these two factors can be made to substantially cancel so that the image planes appear substantially perpendicular to the Z axis of the viewable volume. Further, it can be noted that the image planes are substantially equally spaced which will result in an image of good detail at all depths and of uniform intensity throughout the depth of field. However, through this same region the velocity of the mirror will grossly change, so that obviously the timing of the display must also be closely controlled and referenced to the mirror to obtain the flat, equally spaced image planes.

In addition, it will be noted that arrowheads have been place on the edges of each of the image planes with alternate image planes having arrowheads of the same direction. In essence, the alternate images are displayed during one stroke of the mirror, such as the forestroke, with interlaced images being put up during the backstroke. Actually, it can be shown that because the mirror direction and velocity have reversed, the vertical direction of the raster scan must be reversed on the other stroke if the interlaced image planes are to remain substantially perpendicular to the Z axis.

From the foregoing discussion, it can be appreciated that the rate at which each raster scan is displayed and the variation of that rate with mirror velocity or position is very important if the image planes for any stroke are to be reasonably accurately equally spaced. In addition however, it is very important to properly reference the image planes of any one stroke to the mirror vibration if proper interlacing is to occur. By way of example, as the mirror reaches its maximum convex shape, the mirror will stop and then reverse direction, building up its velocity to a maximum velocity when flat and again decreasing velocity until it reaches its maximum concave position, at which time the motion again reverses. Because the mirror velocity or change in contour is very slow at the extremes of mirror motion, normally it is preferable to not start to put up display images at or near the extremes of the mirror motion. This slightly truncates the depth attainable in the three dimensional image although the extent of loss is relatively small, and is preferable, as a significant amount of time in these regions can be devoted to other tasks by the graphics computer. However if, by way of example, the successive images are put up with the proper timing but displaced slightly with respect to the mirror phase, the image planes will be slightly displaced in the Z direction in the image volume, and the image will be slightly distorted because the image planes will no longer be equally spaced. While the amount of the image distortion will not normally be substantial, the same phase error during the return stroke will displace the interlaced image planes in the opposite direction along the Z axis, with the net result that the phase error in the mirror motion is doubled. Stated another way, very little phase error can be tolerated and still obtain a reasonably spaced and interlaced image planes throughout the forestroke and backstroke cycles combined. Accordingly, it may be seen that not only is timing of the display (and rate of display) of the image planes important, but of particular importance is the very accurate and stable phasing of that display with respect to mirror motion or phase.

Figures 3, 4:
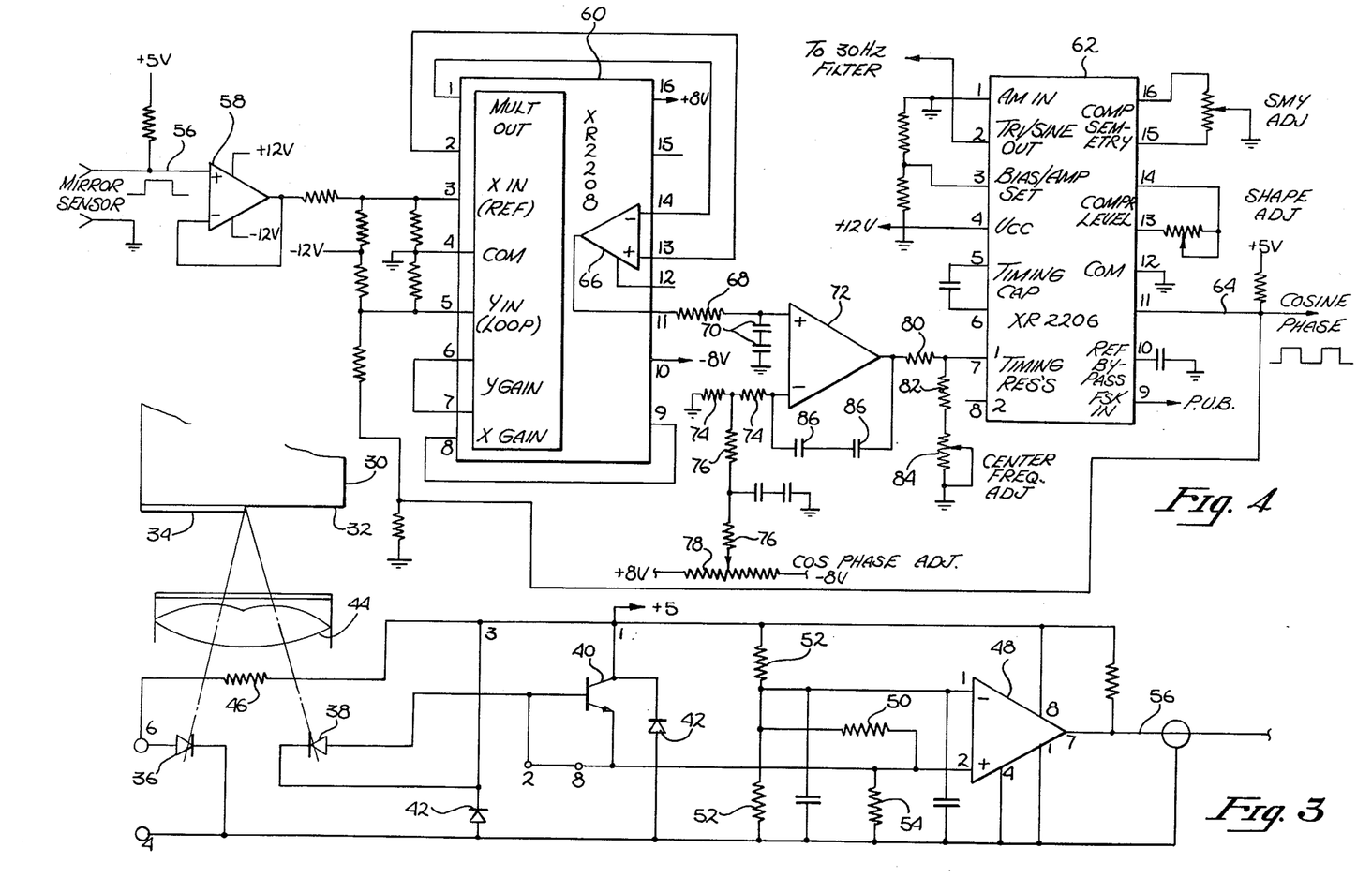
FIG. 3 is a circuit diagram illustrating the present invention method of detecting mirror motion.
FIG. 4 is a schematic diagram which, together with FIG. 3, illustrates the manner in which a signal accurately synchronized with a mirror motion is obtained, which signal separates the forestroke and backstroke motions of the mirror.

Now referring to FIG. 3, the method and apparatus for sensing the mirror motion may be seen. On the edge of the mirror is a weight 30 used to reduce the resonant frequency of the mirror and to control its deflection as desired. Region 32 of the edge of the weight is painted with a flat black paint, with a reflective tape 34 being placed on an opposite portion of the mirror edge so as to provide a relatively sharp transition from flat black to shiny therebetween. Mounted adjacent to the edge of the weight is a HEDS 1000 light emitting photodiode assembly comprising light emitting diode 36, photodiode 38, transistor 40, substrate diodes 42 and bifurcated lens 44. This unit is positioned so that light emitting diode 36 is focused substantially at the transition between the reflective tape 34 and the flat black region 32, with light being reflected from that region being focused onto photodiode 38 when the mirror is at its quiescent position. Obviously, when the mirror is vibrated, the same position will be the maximum velocity position of the mirror. This position is approximate only however, as the various parts of the assembly cannot practically be sufficiently accurately located so that the transition from light to dark as detected by the photodiode 38 occurs sufficiently accurately at the maximum velocity position. The tolerances can be readily controlled however, so that the transition will be sensed when the mirror has substantial velocity, though not necessarily its maximum, even when the mirror is driven at less than its maximum drive.

In operation, resistor 46 provides current limiting for the light emitting diode 36. Comparator 48 has both of its inputs coupled through resistor 50 to the centerpoint of the voltage divider comprised of resistors 52 in series between the positive power supply and ground. When the light emitting diode 36 is directed toward the flat black surface 32 on the edge of the mirror, photodiode 38 is substantially non-conducting so that the resistor 54 may bias the positive input of the comparator slightly lower than the negative input, whereby the output of the comparator on line 56 will be low. However, when the light emitting diode 36 is illuminating the reflective tape 34, the reflection from that tape will make photodiode 38 substantially conductive, pulling the positive input to the comparator higher than the negative input and driving the output on line 56 high. Thus, the output of the comparator 48 will be a square wave, with the reflective tape-flat back regions being positioned so that the output of the comparator will be high when the mirror is concave and low when the mirror is convex. It should be noted however, that while the square wave is very accurately centered around the peak concave position as a result of very fast switching of the optical sensing system independent of the direction of motion, the square wave will not generally have a 50% duty cycle because of the various mechanical, optical and electrical tolerances. Consequently, while the square wave is well centered on the peak concave position, the edges of the square wave, in all likelihood, will be substantially inward from or outward from the maximum velocity positions.

The signal that is actually desired for the timing of the invention is a signal representing the peak concave position of the mirror. From this position of the mirror, the mirror motion and position for all other times may readily be predicted, since the mirror is driven in a typical system under crystal control and will constantly vibrate with the same sinusoidal characteristics. The peak mirror positions are detected from the output of comparator 48 on line 56 by the circuit of FIG. 4. The signal on line 56 is a square wave centered around the maximum concave condition of the mirror, probably with a duty cycle significantly different from 50%. What is desired is a square wave of 50% duty cycle separating the backstroke of the mirror from the forestroke. If the signal on line 56 is considered as a signal of sine phase, then the desired output signal is a square wave of 50% duty cycle of cosine phase.

The signal on line 56 is buffered by operational amplifier 58 and applied to one input of an XY multiplier (in the preferred embodiment and XR 2208 operational multiplier). The other input to the XY multiplier is a feedback signal from the output of a voltage controlled amplifier 60 (in the preferred embodiment, part of the XR 2206 function generator). Nominally, the voltage controlled oscillator is set to oscillate at the same frequency as the mirror (i.e. at 30 Hz.). Assume for the moment that the voltage controlled oscillator 62 is oscillating at the same frequency as the mirror but phase displaced from the desired cosine phase with respect to the signal on line 56. The XY multiplier will multiply those two signals to get an output dependent upon their product. In general, the product of two sine wave signals of the same frequency will be a DC component and a twice frequency component, the magnitude of the DC component depending upon the relative phase of the two signals. If one is a sine wave and one is a cosine wave, the DC component will be zero (and substantially linear therearound for small variations in phase of one signal with respect to the other). In the case of two square waves, a similar result is obtained, even if the square waves are not of 50% duty cycle, as the products of the harmonics making up the square waves will also have a zero DC value when the two square waves are 90° apart. Consequently, the output of the XY multiplier in general will be a DC (or very low frequency) signal together with a plurality of harmonics of the mirror motion. As previously stated, the DC or low frequency signal will have an amplitude indicative of the phase error between the sine phase square wave on line 56 and the cosine phase signal on the output of the voltage controlled oscillator (i.e. on line 64) with the sign of that signal indicating the direction of the phase error.

The output of the multiplier is amplified by amplifier 66, with the output of the amplifier being coupled by the RC circuit comprised of resistor 68 and back-to-back capacitors 70 to one input of differential amplifier 72 (the capacitors in series shown in various places in this circuit are back-to-back polarized capacitors to provide a relatively high non-polarized capacitance as desired). The other terminal of the differential amplifier 72 is referenced to ground by resistors 74, but includes a slight bias adjustment through resistors 76 and potentiometer 78. In effect, the potentiometer adjustment is a phase adjustment for the entire circuit, as the bias sets the effective zero, the output of the multiplier representing the phase error between the sine phase on line 56 and the cosine phase on line 64. Finally, the output of amplifier 72 is coupled through resistor 80 to the input of the voltage controlled oscillator 62, with resistor 82 and potentiometer 84 providing a center frequency adjustment for the oscillator (the remaining resistors and capacitors and potentiometers coupled to the various terminals of the voltage controlled oscillator are generally in accordance with the manufacturer's recommendations). The output of amplifier 72 is also fed back through capacitors 86 to the negative input of the amplifier. Thus, amplifier 72 acts as an integrator (i.e. the output thereof is the integral of the differential input).

When there is a phase error between the sine phase on line 56 and the cosine phase on line 64 (i.e. they are not exactly 90° apart) the multiplier will have a DC (or very low frequency) output which in turn will be amplified by amplifier 66, causing a differential input to amplifier 72. The combination of resistor 68 and capacitor 70 will, in general, filter out most of the harmonics also contained in the multiplier output signal so that amplifier 72 will not be operative on those harmonics. The differential input in amplifier 72 will result in an increasing output from the amplifier of appropriate phase to control the voltage controlled oscillator to correct for the phase error. When the entire circuit settles after initial turn-on, the differential input to amplifier 72 will go to zero (neglecting multiplier and amplifier biases corrected by the adjustment of potentiometer 78) with the output of amplifier 72 settling at a value to hold the voltage controlled oscillator at the appropriate frequency and phase. Thus, the cosine phase output on line 64 representing a 50% duty cycle square wave indicative of forestroke and backstroke will be very accurately referenced to the actual mirror position irrespective of mechanical, optical, or electronic drifts in the circuit of FIG. 3. Further, because the circuit of FIG. 4 is relatively slow to respond to disturbances, and because the mirror itself is driven from a crystal oscillator, the output on line 64 is not only accurately referenced to the mirror but is also quite free of jitter, a parameter that would cause a corresponding jitter in the apparent image plane positions along the Z axis in the ultimate display.

Figure 5:
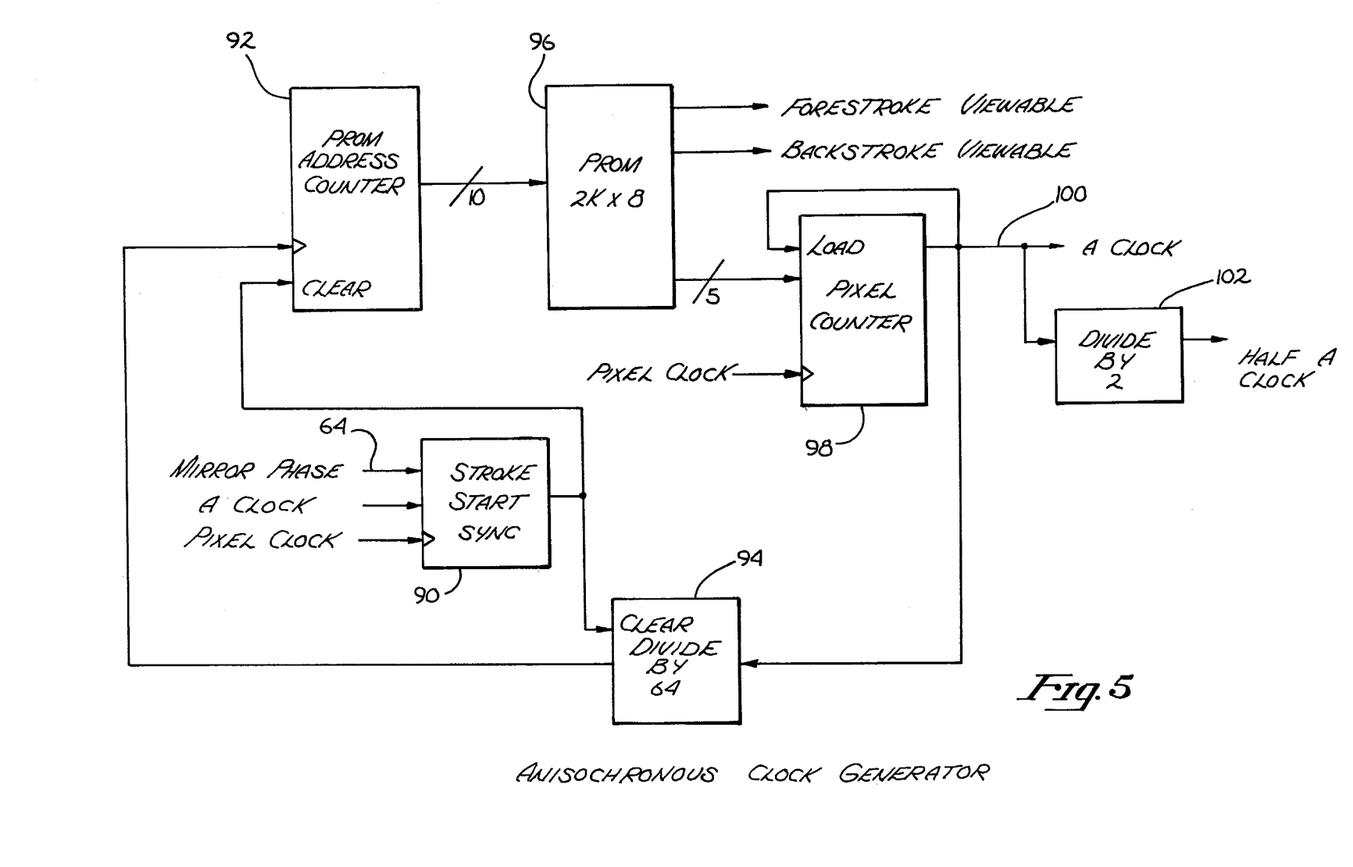
FIG. 5 is a block diagram of the anisochronous clock generator of the present invention.

Now referring to FIG. 5, a block diagram of the anisochronous clock of the timing system may be seen. In this figure, two fundamental inputs are shown, specifically the MIRROR PHASE corresponding to the signal on line 64 of FIG. 4, and a clock signal identified as PIXEL CLOCK. The PIXEL CLOCK is a fixed high rate clock signal corresponding to the duration or time length of each pixel in each image plane for both the backstroke and the forestroke. In that regard, each pixel of each image plane of each stroke has the same predetermined time length so that each pixel of each plane will have the same intensity when on. In the anisochronous clock, the PIXEL CLOCK is used as the fundamental reference for the circuit, in the preferred embodiment being a 16 MHz signal. The MIRROR PHASE, of course, is a square wave, being high during the mirror forestroke and low during the mirror backstroke.

The purpose of the circuit shown on block diagram form in FIG. 5 is to generate signals referred to as A CLOCK and HALF A CLOCK, which signals are used as the fundamental timing signals for the display. In particular, memory access for display purposes in the system in which the present invention is used is at the rate of HALF A CLOCK, the other one half being available to the graphics computer for memory read and write purposes. As may be seen in FIG. 5, the MIRROR PHASE on line 64, the PIXEL CLOCK signal and the feedback of the A CLOCK signal are applied to a stroke start sync circuit which clears the PROM address counter 92 and the divide by 64 circuit 94 upon the simultaneous occurrence of MIRROR PHASE, A CLOCK and PIXEL CLOCK. When cleared, the PROM address counter 92 will contain a zero count, thereby pointing to the first memory location of PROM 96 which is a 2k×8 programmable read only memory programmed in a manner to be subsequently described. Two of the 8 outputs are used to indicate the viewable portion of the forestroke and the viewable portion of the backstroke (the end regions of the forestroke and backstroke not being "viewable" in that data is not displayed in these regions of very low mirror velocity). One of the PROM outputs is unused, with the remaining 5 outputs providing a 5 bit number for parallel loading into the pixel counter 98.

The purpose of the pixel counter is to count up at the PIXEL CLOCK rate from the number loaded from the PROM, with the overflow or carry output on line 100 providing the A CLOCK signal, and when divided by 2 by the divide by 2 circuit 102 the HALF A CLOCK. To reload the pixel counter 98 from the PROM 96, the A CLOCK signal on line 100 is also applied to the divide by 64 circuit 94, with the output thereof going to the PROM address counter 92. Thus, the PROM address counter and accordingly the address for PROM 96 is advanced upon the occurrence of 64 A CLOCKs.

Having described the individual functions of the various blocks of FIG. 5, a better overview of the operation of the anisochronous clock generator of FIG. 5 may now be given. The display system itself, not comprising part of the present invention, utilizes a display memory 128 bits wide so that in the raster scan mode, each display memory access accesses 128 bits comprising 16 pixels, each with an eight bit gray shade code. Since memory access for display purposes is at HALF A CLOCK rate, each A CLOCK effectively accesses 8 pixels per A CLOCK. Consequently, the number of A CLOCKs per line equals the number of pixels per line of scan divided by 8. Further, the display system itself is timed by the pixel clock, in that once a horizontal sweep is initiated, the line will sweep with a sweep time equal to the PIXEL CLOCK rate times the number of pixels per line (variable under software control in the preferred embodiment). Since memory access for display purposes at the HALF A CLOCK rate is an access of 16 pixels at a time, the number of pixels per line which may be selected must be in increments or multiples of 16. Finally, the total number of pixels which the preferred embodiment may display is 256K pixels (actually 262,144). These parameters, as previously mentioned, are parameters imposed on the present invention by the system within which it is used and not by the present invention itself.

Using the foregoing parameters, one might choose to display a three dimensional image using 64 two dimensional images (see FIG. 2) each being 64 pixels by 64 pixels. Since, as stated before, the number of A CLOCKs per line equals the number of pixels per line divided by 8, the display system will count off 8 A CLOCKs before initiating the next scan line. In general, since 8 pixels are displayed for each A CLOCK, each pixel being displayed at the PIXEL CLOCK rate, the maximum A CLOCK rate cannot exceed one eighth of the PIXEL CLOCK rate. Thus, the 5 bit number loaded from PROM 96 through the pixel counter 98 must always be at least 8 PIXEL CLOCK counts from the maximum count of the counter when the carry is obtained. If it is exactly 8, the A CLOCK will be at the maximum possible rate of one eighth of the PIXEL CLOCK, so that scan lines are displayed one immediately following another with no delay (other than that required for retrace), or at maximum scan rate, a condition which occurs when the mirror is at its maximum velocity giving maximum viewable volume Z sweep rate.

As the mirror starts to slow down, the individual sweep rate, as previously mentioned, is not altered, but the repetition of successive sweeps is increasingly delayed. This is achieved by loading a lower number from the PROM 96 into the pixel counter 98 so that more than 8 PIXEL CLOCKs must be counted for the reoccurrence of each A CLOCK. As shall subsequently be seen, the pixel counter 98 is an 8 bit counter, the most significant 3 bits being tied high so as to effectively realize a 5 bit counter with the carry output being used as the load signal as well as for the generation of the A CLOCK as shown in FIG. 5. Obviously the pixel counter, being a 5 bit counter, may be loaded with any number from zero to thirty-one, though in order to maintain a minimum of 8 PIXEL CLOCKs for each A CLOCK, the maximum number which will be loaded into the pixel counter will be 23. For regions where the mirror velocity is approximately one half its maximum velocity, 16 PIXEL CLOCKs per A CLOCK would be desired and accordingly, the number loaded into the pixel counter from the PROM would be 15 in this example.

Figure 6:
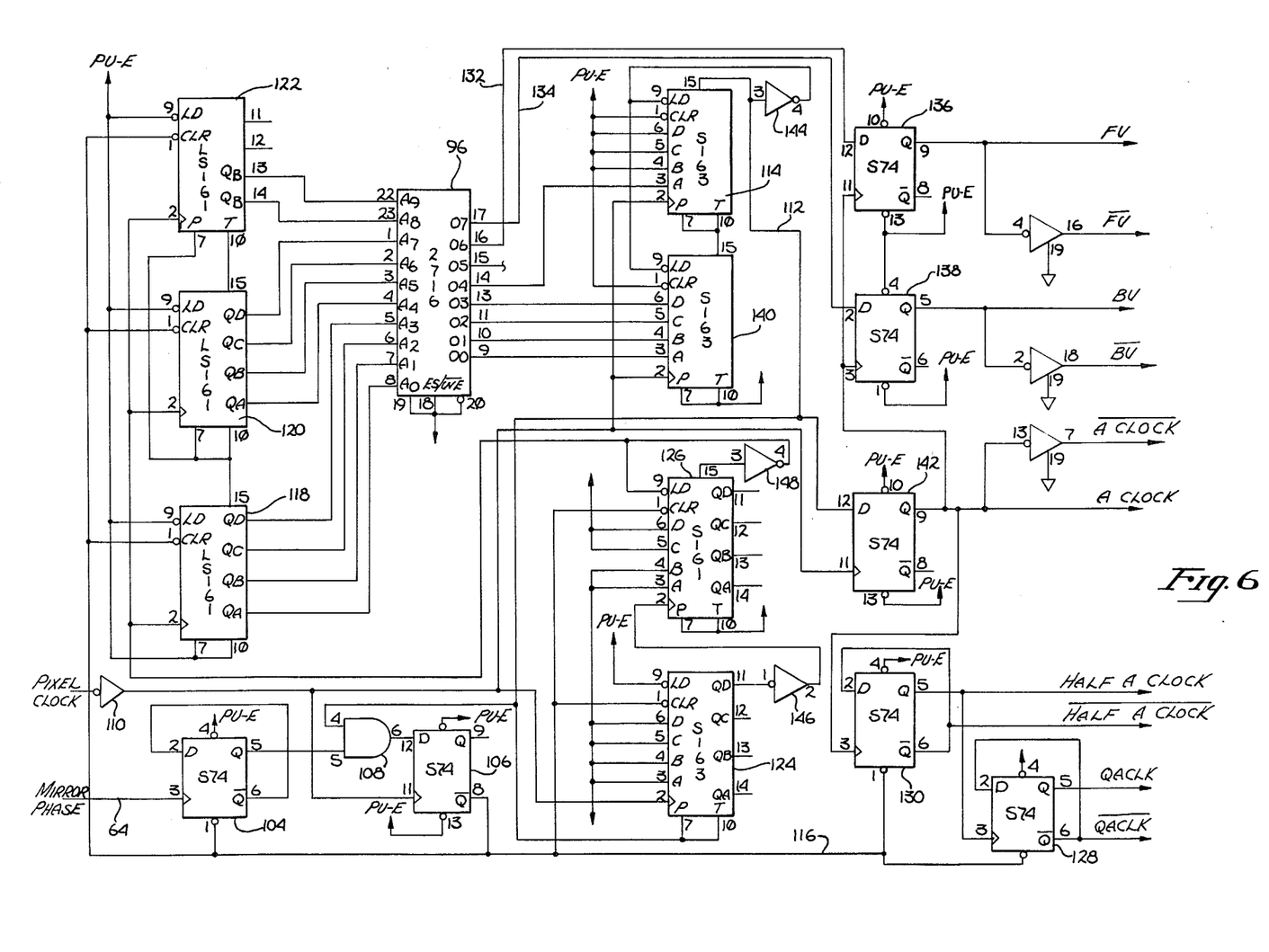
FIG. 6 is a detailed circuit diagram for the anisochronous clock generator of FIG. 5.

Now referring to FIG. 6, the actual circuit realization of the anisochronous clock shown in diagram form in FIG. 5 may be seen. The numbers given within the various blocks are standard 7400 series TTL designations, with the pin numbers corresponding to the actual pins of the respective TTL parts, with one exception. That exception is the 2716 which is the 2K by 8 erasable programmable read only memory 96, a part made by Intel Corporation and others.

It may be seen in FIG. 6 that flip-flops 104 and 106 in combination with AND gate 108 (and inverter 110), combine the MIRROR FORESTROKE signal, the PIXEL CLOCK, and a feedback of the carryout signal on line 112 of counter 114 to provide a negative signal on line 116 upon the occurrence of all these signals. The PIXEL CLOCK and A CLOCK, of course, are relatively high frequency signals in comparision to the MIRROR FIRESTROKE signal, which occurs only 30 times per second in sync with the mirror vibration. The low state on line 116 clears each of 4 bit counters 118, 120, 122, 124 and 126 as well as flip-flops 128 and 130, and further clears flip-flop 104 (a positive edge triggered flip-flop). This drives the output of AND gate 108 low so that the next PIXEL CLOCK signal will reset flip-flop 106, driving line 116 high to remove the clear signal. At this point, 4 bit counters 118, 120, and 122, cascaded to provide a 10 bit counter for addressing PROM 96, are all set to zero so that the lowest address of the PROM is addressed.

As previously mentioned, the beginning and end of each stroke is not used for display because of the very low mirror velocity in these regions. Accordingly, the output of PROM 96 on lines 132 and 134 will be low so that the outputs of flip-flops 136 and 138 providing the FORESTROKE VIEWABLE and BACKSTROKE VIEWABLE signal respectively will both be low. Since the mirror is not yet in the viewable region of its stroke, the A CLOCK desired in this region in the preferred embodiment is the highest rate A CLOCK (i.e. one eighth of the pixel rate) as the A CLOCK signal, or more particularly the HALF A CLOCK signal, is used in this region as well as in the viewable region to provide memory access to the display memory by the computer for storage and retrieval of graphics data which access is desired to be at the highest rate whenever reasonably convenient. Accordingly, the output of the PROM 96 on the lower data lines will be the binary number corresponding to decimal 23, which is loaded into counters 114 and 140 cascaded to provide a 5 bit counter (actually an 8 bit counter with the three most significant bits of the parallel load data lines being pulled high so that the carry out signal will be achieved when the lower 5 bits count to 31). It may be seen that the counters 114 and 140 are clocked by the PIXEL CLOCK, with 8 PIXEL CLOCKs giving a carry out signal on line 112, providing the A CLOCK signal through flip-flop 142 also clocked by the PIXEL CLOCK, and also providing feedback to pixel counters 114 and 140 through inverter 144 to again parallel load the output of the PROM. The signal on line 112 is also coupled to the T and P inputs of counter 124, the upper bit of which is coupled through inverter 146 to provide a clock signal for counter 126. These parallel load counters have their inputs coupled to high and low states such that a carry out of counter 126 to inverter 148 occurs once every 64 signals on line 112, thereby providing the divide by 64 function. The output of inverter 148, of course, provides the desired clock signal to counters 118, 120, and 122 forming the PROM address counter to advance the count by one as a result of the T and P lines of counter 118 being tied high. Thus, after 64 A CLOCKS, the count of PROM address counter is advanced by one so as to address the next address of the PROM 96.

In general, the same information will be stored in the first few locations of the PROM until the first image is to be displayed (starting at some multiple of 64 A CLOCKS from the beginning of the mirror forestroke). At this point, the address of the PROM is advanced once again, with the output of the PROM changing so that line 132 is now high to provide the FORESTROKE VIEWABLE signal output from flip-flop 136, and the output on the lower 5 data lines changing from 23, representing the highest rate, to some substantially lower value corresponding to the low mirror velocity, or more properly the low rate of sweep through that region of the viewable volume. It may be seen that as the mirror proceeds through the forestroke, the address of the PROM will be advanced every 64 A CLOCKs, the output of the PROM initially indicating that neither forestroke or backstroke are viewable and providing an A CLOCK which is one eighth the PIXEL CLOCK, subsequently changing to indicate that the forestroke has become viewable and at the same time providing an output to give a much lower A CLOCK rate in accordance with the low mirror velocity at the time, building to a high A CLOCK rate again as the mirror passes through its maximum velocity, and decreasing again until the end of the viewable portion of the forestroke is reached, after which the output again changes to indicate neither forestroke or backstroke are viewable and to provide the highest A CLOCK rate again.

The circuit in FIG. 6 is triggered (i.e. the stroke start sync is generated) at the beginning of each MIRROR FORESTROKE. Accordingly, the circuit continues to advance the address of the PROM from zero at the beginning of the forestroke, through the entire forestroke and also through the backstroke until being reset by the beginning of the forestroke again. In the example given before wherein 256K pixels are to be displayed in 64 images, each having 64 by 64 pixels, 32K A CLOCKs will be required (as a result of 8 pixels per A CLOCK). Since 64 A CLOCKs are obtained for each PROM address, 512 memory locations of the PROM will be required to store the A CLOCK information throughout the viewable portion of the mirror motion. Additional memory capacity is also required, of course, to generate the A CLOCKs during the non-viewable portion of each stroke, though in the preferred embodiment both viewable and non-viewable A CLOCK information may readily be stored within 1K of the PROM storage capacity.

The concepts, block diagrams and detailed circuits of the present invention have been described in detail herein. A PROM listing has not been given however, as the listing itself is not a program for the operation of the timing system of the present invention, but instead is merely a listing of data calculated to match the parameters of a particular system, which of course may be expected to vary with the system design itself. Accordingly, it is believed more instructive to provide the method of calculation of the data to go into the PROM, whereby the required data for any particular system may be calculated by anyone having knowledge of the parameters of that particular display system.

The calculations may proceed as follows. Pixel spacing along the Z axis of the image volume should be uniform throughout the volume, preferably as small as possible, the limit of which is equal to the maximum image velocity within the viewable volume divided by the pixel frequency. By way of specific example, in one embodiment of the present invention the maximum image velocity is approximately 3457 cm per second, with a pixel frequency of approximately 15.7 Mhz giving a pixel spacing of approximately $2.2\times10^{-4}$ cm between pixels. The number of pixels in the viewable volume is equal to the depth of the viewable volume along the Z axis divided by the pixel spacing along the Z axis. The instantaneous image position is equal to $1/(A \sin \omega t - B)$, where A and B are parameters based on the particular mirror and display (the foregoing equation being referenced to the mirror center point and not the beginning of the forestroke). In one embodiment, $A = 3.56\times10^{-3}$ and $B - 1.49\times10^{-2}$.

Assuming that the mirror is vibrating at 30 Hz, and has just reached the starting point, i.e. the start of the forestroke, the viewable portion of the mirror forestroke is purposely delayed 1.67 ms from the beginning of the forestroke (and the viewable volume ends 3 ms before the end of the forestroke). The foregoing equation for the depth of the viewable volume will yield a depth of approximately 31.5 cm. Dividing that by the pixel spacing of $2.2\times10^{-4}$ cm, the number of pixels which may be displayed per stroke within that volume is slightly over 143,000, or more than 286,000 considering the interlacing of images during the backstroke. Obviously, this is large than the 256K storage capability of the display refresh memory. However, the number of pixels in each stroke (over 143,000) must include not only displayable pixels but also additional pixel times for raster scan line retrace, and preferably should allow space equal to one half of an image plane at the end of the volume to enable interlacing an equal number of planes on the opposite stroke, thereby requiring pixel times for an extra half plane. As a result, the 64 image planes, each of 64 by 64, will require significantly more pixel times per stroke than the number of pixels which may be displayed per stroke.

The Z depth attributable to one A CLOCK will be 8 times the pixel Z depth separation, or approximately $1.7584\times10^{-3}$ cm. Since the embodiment disclosed herein repeats any A CLOCK 64 times before updating the A CLOCK, 64 A CLOCKS will have a viewable volume depth of 0.11254 cm. Consequently, if the viewable volume starts 1.67 ms into the forestroke (10 ms from the start of the sinusoidal motion), one can calculate using the foregoing equation for image depth vs. time, that the apparent image position after the 10 ms delay will be $-86.849$ cm. At the end of the first 64 A CLOCKS, the apparent image position will be $-86.849 + 0.11254$ cm, or $-86.7365$ cm. This new distance may then be used in the foregoing equation to calculate a new time for this new apparent image position which calculation yields a time of 10.07054 ms. Accordingly, the first 64 A CLOCKS into the viewable volume should consume $70.54\times10^{-6}$ seconds. Dividing that number by 64 will give the time period consumed by each A CLOCK, and dividing that number by the period of the PIXEL CLOCK yields the first A CLOCK Information to be stored in PROM, specifically 17.326. Obviously, since the PROM is not set up to handle fractional PIXEL CLOCKs in this manner, the number of 17 is selected. This will produce a small error in position. This error is taken into account in computing the next A CLOCK control word stored in the PROM, so that the errors do not accumulate. It may be shown for the example given herein that such rounding and the repetition of 64 A CLOCKs before a change in the A CLOCK can .pa be considered will still insure positioning of any pixels to within one half of a spot size.

If the foregoing calculation is continued for the next A CLOCK, it is found that the A CLOCK should be approximately 17.06 PIXEL CLOCKs, and obviously again the value of 17 is chosen. It may be seen that the value is decreasing, so that values under 17, and decreasing to 8 at the maximum mirror velocity position will be obtained. The actual number stored in PROM of course, is not these numbers, but the twos compliment thereof (i.e. if the value is 17 PIXEL CLOCKs, then the binary number corresponding with decimal 14 should be stored, so that the counters will count upward from 14, 17 times to create the carry to generate the A CLOCK.

It will be noted that the two initial values were 17 whereas values as large as 31 could be used. Accordingly, in some situations, viewable volume could be increased somewhat by displaying through a greater percentage of each stroke. It will be recognized that when it is stated herein that the value 14 should be stored at the corresponding PROM location to yield an A CLOCK equal to 17 PIXEL CLOCKs, it is meant that the value 14 should be stored in binary form for the 5 bits used for parallel loading of the pixel counter, separate and apart from the additional 2 bits used for the BACKSTROKE VIEWABLE and FORESTROKE VIEWABLE signals.

There has been described herein a new and unique timing system for vibrating mirror three dimensional displays which very accurately synchronizes itself to the mirror vibration and creates a time reference varying with the rate of sweep of the display volume in the Z direction so that successive pixels and successive image planes are equally spaced throughout the display volume. Obviously, while the invention has been disclosed and described with respect to a preferred embodiment thereof, other embodiments will be readily obvious to those skilled in the art. Based on the disclosure herein given, by way of specific example, one might allow some unequal spacing of the image planes to allow packing more image planes into the display volume at the expense of some distortion. One might also display alphanumeric notes at the extreme ends of the display volume (in the Z direction), and accordingly run the A CLOCK at maximum rate in these now viewable regions. Obviously these and many other variations may be made in the present invention without departing from the spirit and scope thereof.

We claim:

1. A timing system for providing a display reference signal responsive to the momentary sweep rate through the viewable volume of three dimensional displays having a repetitive and nonuniform sweep rate through the Z axis of the viewable volume comprising:

sensing means for providing a repetitive signal indicative of a predetermined Z axis position of the display on its sweep along the Z axis of the viewable volume, first clock means for providing a predetermined high frequency first clock signal, memory means for storing predetermined data at predetermined addresses and for providing said data as data outputs in accordance with addresses presented thereto, addressing means responsive to said sensing means to address a predetermined address of said memory means when the display is at a predetermined Z axis position, and second clock means coupled to said memory means and said first clock means, said second clock means being a means for providing a second clock signal responsive to a number of reoccurrences of said first clock signal as determined by the data output of said memory means, said addressing means also being responsive to one of said first and second clock means to change the address in response to the reoccurrence of a predetermined number of clock signals of said one of said first and second clock means, whereby said second clock means will be responsive to the momentary sweep rate through the viewable volume in a manner determined by the data stored in said memory means.

2. The system of claim 1 wherein said memory means is a read-only memory means.

3. The system of claim 1 wherein said sensing means provides a repetitive signal indicative of the beginning of a mirror stroke.

4. The system of claim 3 wherein said sensing means includes a mirror sensor for providing a mirror sensor signal substantially centered around the maximum mirror velocity positions, and an XY multiplier means coupled to receive said mirror sensor signal as one input thereto, the output of said XY multiplier means being coupled on the output of said sensing means and as the second input to said XY multiplier means, whereby said sensing means output will be to centered around the maximum mirror positions.

5. The system of claim 4 wherein said output of said XY multiplier is coupled to a voltage controlled oscillator, the output of which is coupled as the output of said sensing means and as the second input of said XY multiplier means.

6. The system of claim 5 wherein said output of said XY multiplier is coupled to said voltage controlled oscillator through an integrator having a low pass input thereto.

7. The system of claim 1 wherein said sensor comprises an optical sensor for sensing the movement of the mirror past a predetermined position.

8. The system of claim 1 wherein said addressing means is responsive to a predetermined number of occurrences of the clock signal of said second clock means to change the address.

9. The system of claim 8 wherein said addressing means comprises a first counter.

10. The system of claim 9 wherein said second clock signal is coupled to said first counter through a second counter for counting said predetermined number of occurrences of said second clock signal.

11. The system of claim 1 wherein said second clock means comprises a counter clocked by said first clock means.

12. The system of claim 11 wherein said counter is a parallel load counter, whereby the data from said memory means may be parallel loaded into said counter.

13. The system of claim 1 wherein said first clock means is a pixel clock means.

14. A timing system for vibrating mirror three dimensional displays to provide a display reference signal responsive to the momentary sweep rate through the viewable volume of the display comprising:

sensing means for providing a repetitive signal indicative of a predetermined Z axis position of the display on its sweep along the Z axis of the viewable volume, first clock means for providing a predetermined high frequency first clock signal, read-only memory means for storing predetermined data at predetermined addresses and for providing said data as data outputs in accordance with addresses presented thereto, first counter means setable by said sensing means to address a predetermined address of said read-only memory means when the display is at a predetermined Z axis position, and second clock means coupled to said memory means and said first clock means, said second clock means being a means for providing a second clock signal responsive to a number of reoccurrences of said first clock signal as determined by the data output of said memory means, said first counter means also being responsive to one of said first and second clock means to change the address in response to the reoccurrence of a predetermined number of clock signals of said one of said first and second clock means, whereby said second clock means will be responsive to the momentary sweep rate through the viewable volume in a manner determined by the data stored in said memory means.

15. The system of claim 14 wherein said sensing means provides a repetitive signal indicative of the beginning of a mirror stroke.

16. The system of claim 15 wherein said sensing means includes a mirror sensor for providing a mirror sensor signal substantially centered around the maximum mirror velocity positions, and an XY multiplier means coupled to receive said mirror sensor signal as one input thereof, the output of said XY multiplier means being coupled on the output of said sensing means and as the second input to said XY multiplier means, whereby said sensing means output will be to centered around the maximum mirror positions.

17. The system of claim 16 wherein said output of said XY multiplier is coupled to a voltage controlled oscillator, the output of which is coupled as the output of said sensing means and as the second input of said XY multiplier means.

18. The system of claim 17 wherein said output of said XY multiplier is coupled to said voltage controlled oscillator through an integrator having a low pass input thereto.

19. The system of claim 14 wherein said first counter means is responsive to a predetermined number of occurrences of the clock signal of said second clock means to change the address.

20. The system of claim 19 wherein said second clock signal is coupled to said first counter means through a second counter means for counting said predetermined number of occurrences of said second clock signal.

21. The system of claim 14 wherein said second clock means comprises a second counter means clocked by said first clock means.

22. The system of claim 21 wherein said counter is a parallel load counter, whereby the data from said memory means may be parallel loaded into said counter.

* * * * *